T. W. Ellis, Automatic Liquid Measure.

№ 104129 — Patented Jun 14 1870

Witnesses:
L. S. Mabee
Drisell

Inventor:
T. W. Ellis
per
Attorneys.

United States Patent Office.

THEODORE W. ELLIS, OF MACON, GEORGIA.

Letters Patent No. 104,129, dated June 14, 1870.

IMPROVEMENT IN LIQUID-MEASURES.

The Schedule referred to in these Letters Patent and making part of the same.

To all whom it may concern:

Be it known that I, THEODORE W. ELLIS, of Macon, in the county of Bibb and State of Georgia, have invented a new and improved Automatic Liquid-Measure and Funnel; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object to furnish an improved liquid-measure which shall be so constructed that exactly the desired amount of liquid will flow out automatically from the measure into the receiving-vessel, the measure acting, at the same time, as a funnel; and It consists in the combination of a siphon, having suitable attachments, with the body of the measure, as hereinafter more fully described.

A represents the measure, which may be an ordinary measure or vessel, or one made expressly for my improvement.

B represents the siphon, which is connected with the vessel A, in the manner shown in figs. 1 and 2, so that, in every case, the end or mouth of the shorter arm of the siphon may be at such a distance below the water-line or top of the measure that the said measure, between the water-line and mouth of the said arm, may contain the exact quantity of the liquid desired to be drawn, and so that the highest part or bend of said siphon be a trifle below the said water-line or top of the measure, that the liquid may begin to flow out as soon as the said vessel may be filled to the said water-line.

Figure 1:
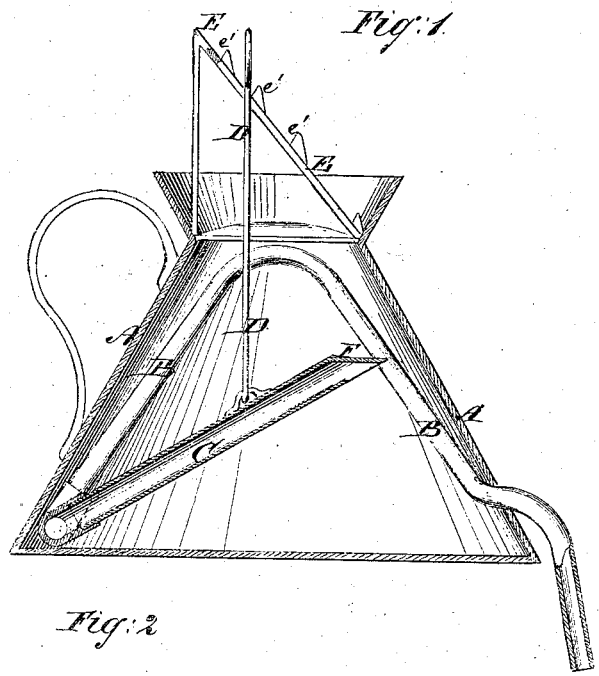
Figure 1 is a vertical section of a measure to which my improvement has been attached.

To the lower end or mouth of the short arm of the siphon B is attached a short pipe or arm, C, swiveled to it, as shown in fig. 1.

Figure 2:
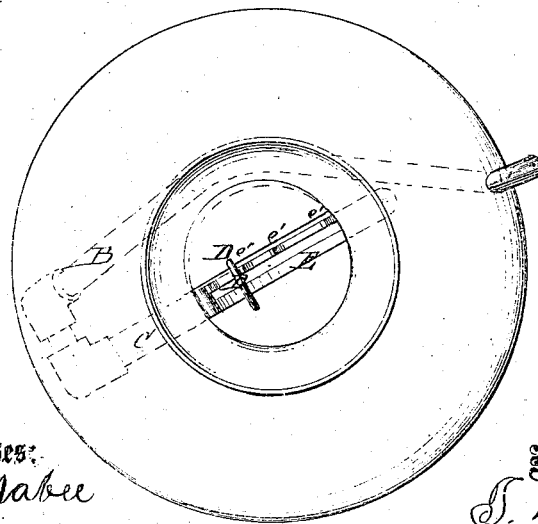
Figure 2 is a top view of the same.

To the swiveled arm C should be pivoted the lower end of the rod D, which extends up through a slot in a gauge, F, upon which is formed a scale of steps, e', as shown in figs. 1 and 2.

By this construction the measure may be adjusted to draw off any desired quantity of the liquid from the measure. In this case, and in all cases where the mouth of the short arm of the siphon does not extend to the bottom of the measure A, the said end or mouth may be provided with a cap, F, as shown in fig. 1; or said end may be turned upward, to prevent the entrance of any of the liquid, after said liquid has descended into the vessel or measure A to the line of the mouth of said arm.

The end of the long arm of the siphon B descends below the bottom of the vessel or measure A, and serves as a funnel for introducing the liquid measured into the receiving-vessel.

Having thus described my invention,

I claim as new and desire to secure by Letters Patent—

1. The combination of a swiveled adjustable arm or pipe C with the end or mouth of the short arm of the siphon B, and with the measure A, substantially as herein shown and described, and for the purpose set forth.

2. The combination of the pivoted rod D and graduated gauge or scale of stops E e' with the swiveled arm or pipe C, siphon B, and measure A, substantially as herein shown and described, and for the purpose set forth.

The above specification of my invention signed by me this 5th day of February, 1870.

THEO. W. ELLIS.

Witnesses:
W. R. BECK,
C. A. SHIVERS.